SAMUEL NATELSON
INVENTOR

Jan. 13, 1970 S. NATELSON 3,489,525
SYSTEM OF AUTOMATIC ANALYSIS
Filed Aug. 25, 1967 4 Sheets-Sheet 2
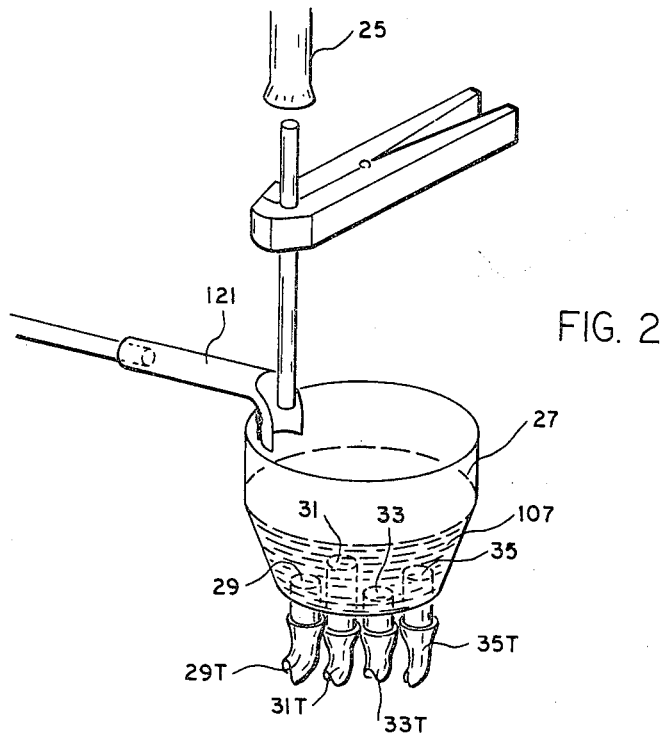
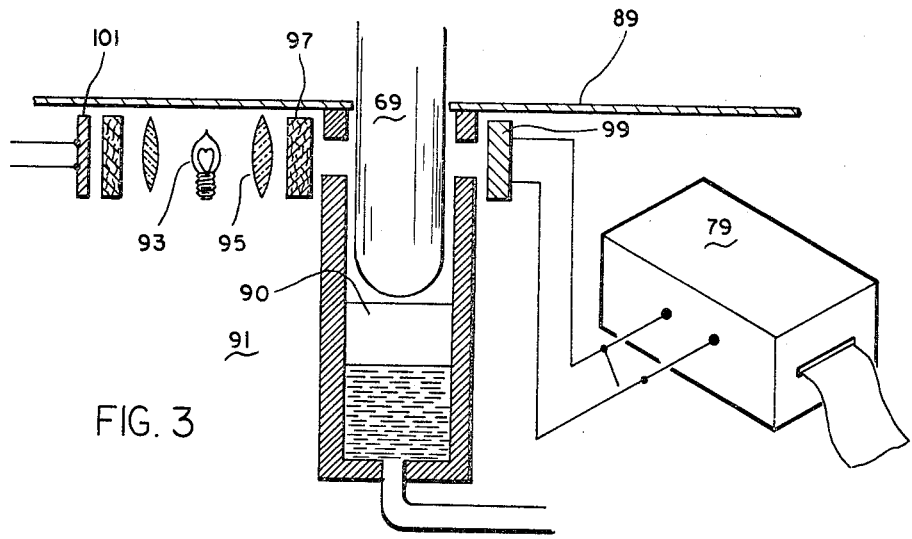
SAMUEL NATELSON
INVENTOR.
George B. Ozjvolk
ATTORNEY

SAMUEL NATELSON
INVENTOR.

Jan. 13, 1970  S. NATELSON  3,489,525
SYSTEM OF AUTOMATIC ANALYSIS
Filed Aug. 25, 1967  4 Sheets-Sheet 4

SAMUEL NATELSON
INVENTOR

BY George B. Oujevolk

ATTORNEY

United States Patent Office 3,489,525
Patented Jan. 13, 1970

3,489,525
SYSTEM OF AUTOMATIC ANALYSIS
Samuel Natelson, Chicago, Ill., assignor to Scientific Industries, Inc., Queens Village, N.Y.
Filed Aug. 25, 1967, Ser. No. 663,360
Int. Cl. G01n *31/00, 33/00*
U.S. Cl. 23—253                                    6 Claims

ABSTRACT OF THE DISCLOSURE

A system for the simultaneous determination of any required number of tests on the same microliter specimen. The system measures out a sample of the order of about 1 to 100 microliters, divides this sample into as many aliquots of test solution as desired and then analyzes each one individually and simultaneously.

BACKGROUND OF THE INVENTION

This invention relates to a system of automatic chemical analysis of samples of material. The system is particularly suitable for analysis of biological materials such as blood and urine.

Present methods of liquid analysis systems may be divided into two classes. In one system a continuous flow arrangement is used. A sample is fed into a peristaltic pump, and the sample is mixed with reagents heated and finally passed through a flow-through cuvet the absorbance of color being recorded on a recorder as peak heights. This system suffers from many weaknesses, a few of which are listed below:

(1) A peristaltic pump cannot measure small volumes of the order of microliter samples, accurately. Wear of the tubings also varies the sample size from day to day.

(2) The peristaltic pump necessarily causes surges in the tubing causing irregular flow. Thus samples move through the readout cuvet rapidly or slowly. When moving through rapidly the pen of the recorder does not reach its peak height before the sample is passed. Since the peak height also depends upon flow rate this must be kept constant. No such system of even, constant flow has been developed.

(3) The heating bath contains a 40 foot coil alternately of air and fluid. Slight temperature variations cause expansion or contraction. This is a serious problem with the flow system and causes surging.

(4) Readout of the flowing system must be scanned with a recorder to find the peak. Reading of peak heights causes error since concentration is actually a function of the area of the curves and not the peak heights.

(5) Cross contamination of specimens occurs since all the samples flow through the same tubing. This makes certain enzyme determinations impractical. High level specimens followed by low level specimens causes a swamping of the low peaks and these need to be repeated.

A second system used, is to sample the specimen by a device called an autodilutor, add reagents and finally pump out the reagents, from their containers, through a flow through cuvet. This system suffers from many deficiencies a few of which are listed below.

(1) The so-called autodilutor picks up the specimen by the movements of a plunger and ejects it with a reagent or diluting solution from a larger plunger. The practical lower limit of sample size with this system is of the order of 50 microliters. However, much more sample is required since the tip must dip into the specimen. The tip of the autodilutor needs to be cleaned or it will contaminate one specimen with a second.

(2) Only one procedure can be processed at a time through this instrument. Thus, if more than one test on the same specimen is required then one needs more instruments.

(3) The flow through cuvet suffers from the same deficiency as the continuous flow system. In addition, flow-through cuvets are slow, the reading slowing down the process. A most annoying problem with flow-through cuvets is the error produced if even a minute bubble of air passes through. Thus, a certain percentage of the tests are necessarily invalid since minute air bubbles cannot be kept from every specimen.

(4) The instrumentation is elaborate and expensive in that numerous processes are involved in this system.

The present invention corrects the defects of the older systems, is extremely rapid and is much simpler than previous systems. A major feature of the present invention is the simultaneous determination of any required number of tests on the same microliter specimen. Thus the system contemplated measures out a specimen of the order of 1 to 100 microliters, divides this specimen into as many aliquots as desired and then analyzes each one individually and simultaneously for the same specimen.

The invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying drawing, showing by way of example preferred embodiments of the inventive idea.

BRIEF DESCRIPTION OF THE SEVERAL VIEWS OF THE DRAWINGS

FIG. 2 shows perspectively one of the components useful in the arrangement depicted in FIG. 1 but on a greatly enlarged scale;

FIG. 3 is a partly schematic cross-sectional explanation of a reading station used in the arrangement depicted in FIG. 1;

GENERAL DESCRIPTION

Figure 1:
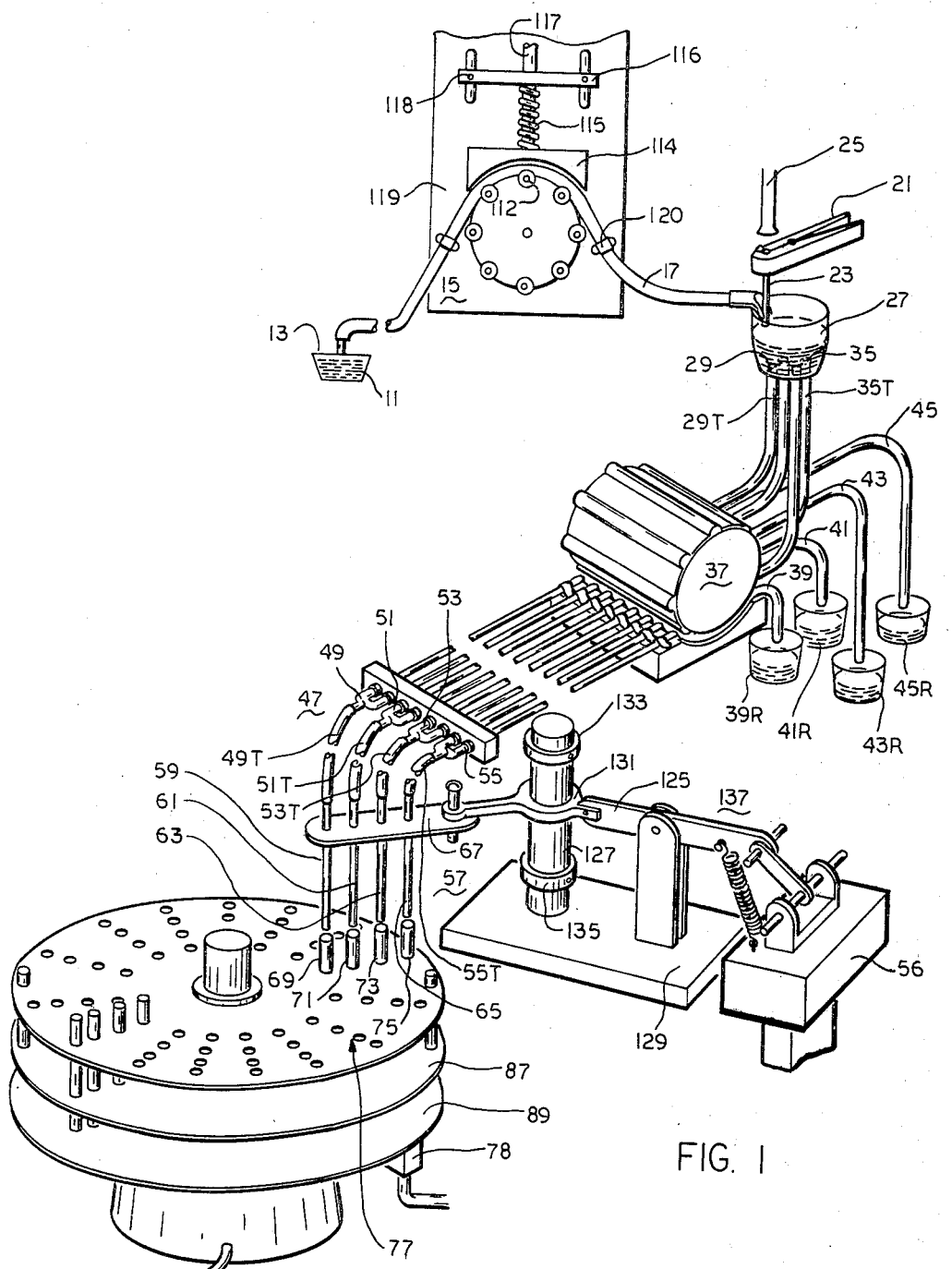
FIG. 1 is a perspective view of the instrument arrangement contemplated herein.
Figure 4:
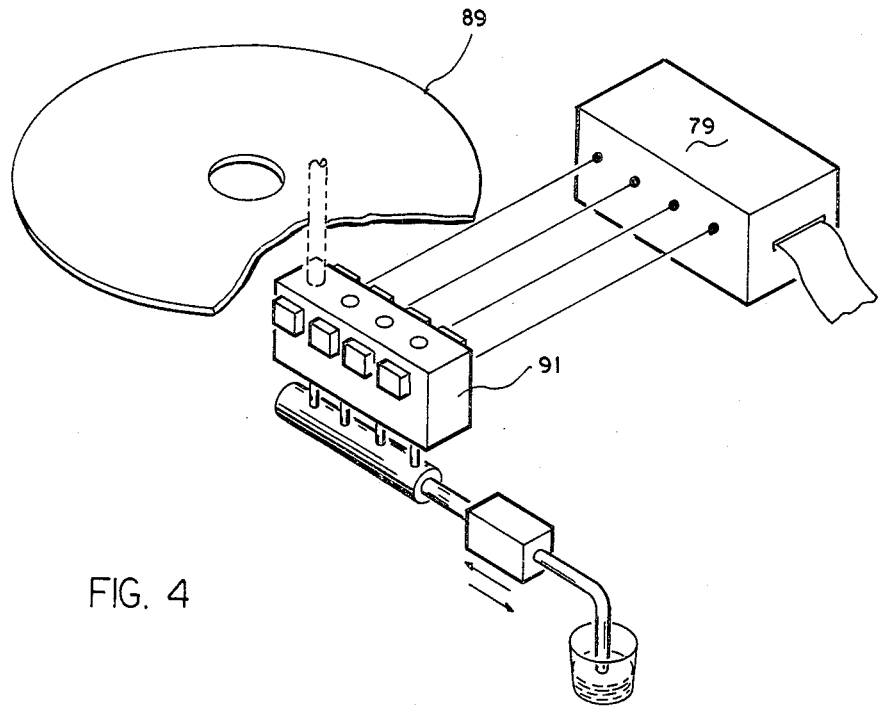
FIG. 4 is a perspective view and explanation of the reading station shown in FIG. 3.
Figure 5:
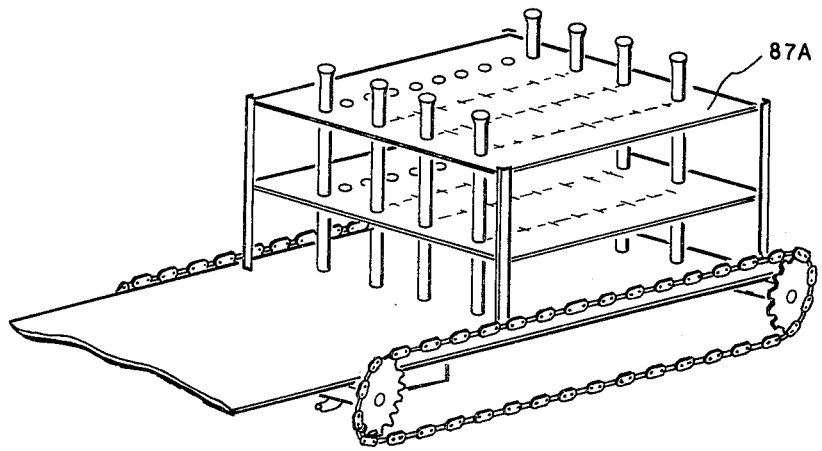
FIG. 5 is a perspective view of another component useful in the arrangement depicted in FIG. 1.
Figure 6:
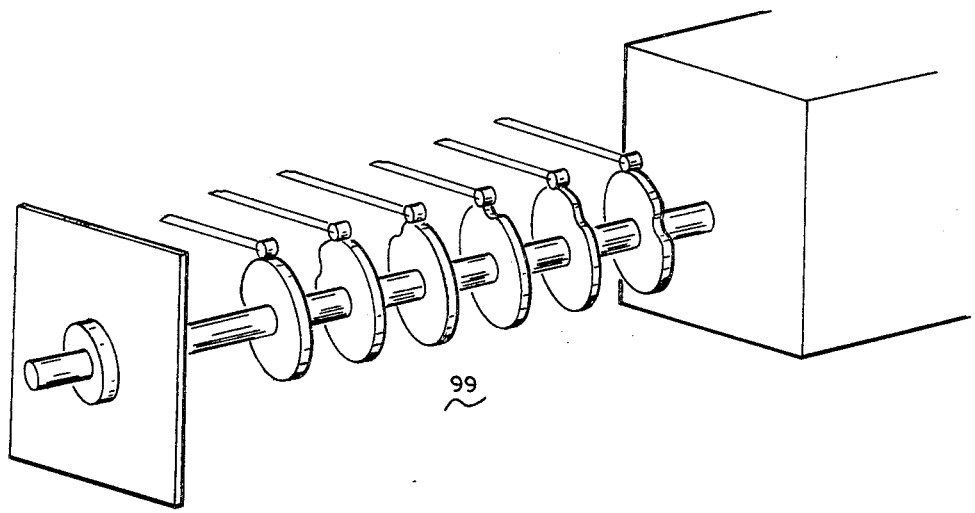
FIG. 6 is a perspective view of the programming components used in the arrangement depicted in FIG. 1.
Figure 7:
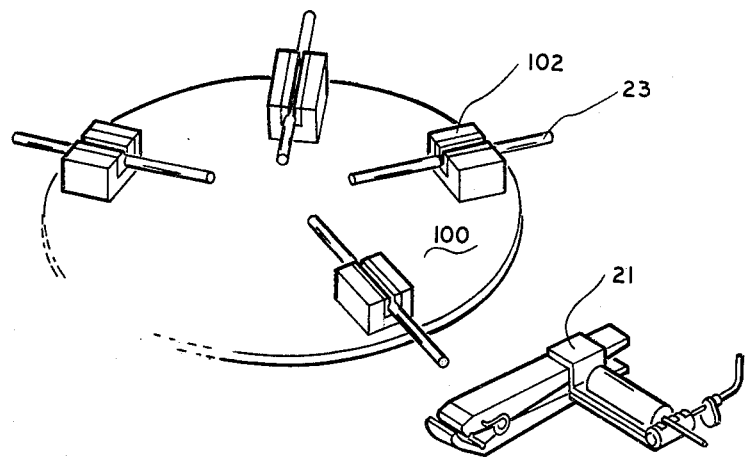
FIG. 7 presents a perspective view of the specimen dispensing means useful in connection with the present invention.

In the present invention, a specimen contained in a capillary tube is mixed with a diluent liquid to form a sample liquid. This sample liquid is then divided into a plurality of sample aliquots. Each aliquot is then separately mixed with a different reagent to form a test solution. The test solutions are then individually assayed and recorded.

In the Samuel Natelson U.S. Patent No. 3,216,804, the present inventor has described how specimens can be disposed for further processing in capillary tubes which are horizontally placed on a rotating sample dispenser. As these horizontal capillary tubes reach a liquid specimen delivery station, the capillary tube is tilted to the vertical position and the substance therein contained is ejected by a blast of compressed air.

In the present invention, a stream of running diluent such as normal saline or water 11 contained in a diluent source 13 is delivered by a peristaltic pump 15 through tubing 17 to a delivery station. At this delivery station, the capillary tubes containing the specimens, disposed on a circular plate and are sequentially picked up by an arm 21 which tilts the capillary tube 23 to the vertical position. A blast of compressed air from a source 25 blows the specimen into the stream of diluent into a mixing container 27 creating a diluted sample. The mixer has a plurality of outlets, e.g., four outlets 29, 31, 33, 35, each connected to rubber tubing 29T, 31T, 33T, 35T, acted on by a pump 37. At the same time a corresponding number of reagents, i.e., four in this case, 39R, 41R, 43R, 45R, are connected by tubing 39, 41, 43, 45 to a reagent station 47 having connectors 49, 51, 53, 55. The tubing 39, 41, 43, 45 passes across pump 37 which pumps the reagent into the connector together with the liquid sample arriving in tubes 29T, 31T, 33T, 35T also connected to the connectors. Thus, the different reagents 39R, 41R, 43R, 45R, are mixed with the liquid sample to form a test solution. From connectors 49, 51, 53, 55, the test solution passes through tubing 49T, 51T, 53T, 55T to an accumulation station 57 where the tubing 49T, 51T, 53T, 55T connects up with needles or rigid tubes 59, 61, 63, 65 mounted on a swinging arm 67. Arm 67 can raise the rigid tubes 59, 61, 63, 65 and then lower these rigid tubes into test tubes 69, 71, 73, 75. When the contents have been emptied, the rigid tubes are raised by arm 57. The test tubes 69, 71, 73, 75 are on a carriage or turntable 87 and move onto a reading station 77. Here the test solution in each test tube is individually read by a reading means 78 and the results thereof are fed to a voltmeter and printed out in sequence on a tape by a printout device 79.

DETAILED DESCRIPTION

The specimen to be processed is disposed in capillary tubes on a circular plate as described in the aforementioned Samuel Natelson U.S. Patent No. 3,216,804 and each capillary tube is sequentially picked up by an arm which tilts the capillary tube to a vertical position. A blast of compressed air blows the specimen into a stream of running diluent such as normal saline or water. This diluent is delivered by peristaltic pump 15. The peristaltic pump 15 starts as the capillary tube lifts from its turntable and continues to run until a definite volume, usually of the order of 4 to 8 milliliters are delivered into a container, i.e., specimen and diluent mixer 27. The outlets of the diluent mixer are sealed because the second peristaltic pump 37 is not moving and the spring loaded press plate 38 keeps the tubing sealed, while diluent 11 is still being pumped into the container mixer 27. The capillary tube now starts to move away from the container mixer 27. Peristaltic pump 15 stops. It is noted that while the liquid sample in container mixer 27 can be mixed by a stirrer or bubbles of air, or by sonic or ultrasonic vibration, these are usually not needed. Mixing is accomplished by the flow of diluent and specimen together into the cup of the mixer. The solution enters the cup of the mixer and swirls around, allowing the mixture to remain undisturbed for 5–10 seconds completes the mixing to form a liquid sample.

Second peristaltic pump 37 now pumps for approximately eight seconds, emptying the diluting cup of the mixer 27, and then stops. The first peristaltic pump 15 starts to operate again, delivering 4 milliliters of rinse solution to the diluting cup of the mixer, and then stops. Peristaltic pump 37 now pumps for 10 seconds emptying the cup of the mixer, clearing the tubing to the test tubes in the turntable with air. At the same time reagent 39R, 41R, 43R, 45R is being pumped in from reagent containers via tubing 39, 41, 43, 45.

When the peristaltic pump 37 begins to operate, the solenoid 56 of accumulation station 57 has previously been activated. The rigid Teflon coated stainless steel tubes 59, 61, 63, 65 are therefore in a down position, their tips being near the bottom of the test tubes. The peristaltic pump 37 then pumps the contents of the sample and diluent mixer 27 into these test tubes after it has divided the specimens into four parts. The four parts need not be equal, this being predetermined by the bore of the tubing 29, 31, 33, 35 which leads to the peristaltic pump. This is also true for the volume of reagents pumped. The contents of the test tubes are also thoroughly mixed by the solutions and air being pumped in from the peristaltic pump.

At this time the peristaltic pump 37 stops, the solenoid 56 of accumulation station 57 is inactivated and the stainless steel tubes 59, 61, 63, 65 or needles lift out of the test tubes. Because of the Teflon coating of these steel tubes, the tubes are not wetted and are lifted out without adhering solution. Silicone coating can be used for the same purpose. The test tubes are disposed in radial rows on a turntable 87, there being four test tubes in each row. The rows are defined by appropriate apertures for receiving the test tubes.

The turntable 87 now advances one position. Arm 67 is controlled by a solenoid 56 which when activated dips the Teflon coated stainless steel tubes into succeeding sets of four tubes. The process described above is repeated, at this stage as succeeding sets of capillary tubes move into position to be sampled.

If the turntable 87 holds 60 sets of test tubes there are then sixty positions. After the particular set of tubes has been loaded with reagents and sample, additional reagents may be added at subsequent positions if required by a suitable pump such as a syringe pump or a peristaltic pump.

After all the sets of tubes have been loaded, the tubes come to a position over movable plungers, e.g., plunger assembly 91, moved up or down by a suitable mechanism such as a cam, a solenoid or an oil or air pump. The location of this work station is determined by where one starts the first specimen. For example, in one particular set-up, 30 seconds elapses from position to position. Thus station 77 represents twenty minutes. If the reaction is completed in this time then the turntable 87 is rotated so that the test tubes arrive at the readout station in proper time. If a longer time is required, then after all sixty positions are filled, the turntable continues to move from position to position until the required time elapses. For example, if readout station is placed at the same position then with a second rotation, this same position would be the position for about 50 minutes. Readout may be made as many times as required in following a developing reaction as the turntable goes around. Where rotation is more than 360° before readout the readout plungers are not activated in the first cycle.

The readout system can best be seen from the cross-sectional view shown in the drawings. When the pump is activated, oil is pumped into the manifold and the plungers move up to a stop position level with the bottom stationary plate 89. As the turntable moves the tubes slide along the bottom stationary plate 89. When they come to the position where the test tubes rest on the plungers 90, the oil is pumped in the reverse direction and the plungers move down. The test tubes are then lowered into a readout cuvet. Light from a bulb 93 passes through a lens 95 to collimate the light, and through a filter 97 to remove unwanted wavelengths. The light passes through the test tube 69 and activates the phototube 99. A second similar setup monitors the light intensity by reading the light on a reference phototube 101. The reference phototube 101 is connected through suitable resistors to buck out the readout phototube 99. This arrangement is to correct for lamp intensity variations. The signal is finally amplified and fed to a printout device 79. The test tubes are read in sequences by a switch arrangement which switches from readout cuvet to readout cuvet. Each test tube has an independent phototube system. Thus the printout prints the light absorbance of 1st, 2nd, 3rd, and 4th etc. tube in sequence. After the turntable 58 turns, the next set of test tubes is lowered into the cuvet and the results are printed out in the same sequence. An identifying number for each set printed indicates which set of test tubes is being printed out.

The sequence of steps in the procedures are all controlled from a main drive shaft which also controls the apparatus described in the Samuel Natelson U.S. Patent No. 3,216,804. This drive shaft is fitted with a series of cams and microswitches. The cams control the time of each operation and the sequence of operation. In this way every step is kept in phase.

A variation of the instrument is to replace the turntable 87 by a series of test tube racks 87a moving on a smooth base. The test tube racks move forward from position to position sequentially, driven by a motor activating a Geneva movement which moves a chain drive a fixed distance when the microswitch is activated. The rear racks push the rack forward. This can be seen in the drawing schematically. A readout zone is shown close to the rack. In practice, it may be several rack lengths away. In this embodiment, the test tubes are loaded as before from the Teflon coated stainless steel tubes and the rack moves forward. A heated air or water bath zone, for certain tests is used before the tubes come to the readout station. Generally, whether the straight rack system or turntable system is used, constant temperature is advantageous. This is accomplished by placing the turntable in a heat controlled air bath. If a liquid bath is used with the straight rack system, the water bath covers only the portion of the test tubes containing liquid while passing through the heating zone.

For the instrument herein described, it is important to use proper components.

Sample dispenser 100 is an arrangement for the sequential delivery of samples from capillary tubes by an air blast through the capillary tube. In one arrangement the capillary tubes are disposed in capillary holders 102. The capillary holders 102 are disposed around the periphery of the positioning means. To direct the action of the specimen and the diluent liquid, a special plastic mixing funnel 107 is fitted on the container mixer 27 which is held firmly in place.

Solution 11 which may be water, saline, or a reagent is pumped to special plastic mixing funnel 107 as a wash solution. The pumping action will be performed by a wheel with rollers 112 acting on plastic tubing 17 to pump the wash solution. The tubing is firmly held against the rollers by a spring loaded clamp 114. The spring 115 is held at the desired tension by a flat metal plate 116 having a hole at the center thereof through which a center rod 117 is free to slide up and down. The tension on the spring may be adjusted by adjustment screws 118. This pump assembly is mounted on a metal plate 119. In similar manner a press plate is held to roller 37 to maintain pressure on the tubes. The pump is actuated by a motor turning the wheel (the motor is not shown). The motor is in back of the metal plate. To prevent slippage of the plastic tubing, there is a stop and collar 120. The plastic tubing of the pump terminates in a glass spout 121 through which the wash solution drips. Spout 121 is part of special plastic mixing funnel 107. This action is controlled by the pump motor so that flow occurs and the spout drips only when the capillary is in the vertical position.

The specimens and diluent fall into funnel 107 which will carry the sample. Reagents 39R, 41R, 43R, 45R are mixed with the sample to form a test solution in a pump 37 similar to that just described but adapted to act on a plurality of tubes. The sample and the reagent are combined by connectors 49, 51, 53, 55 so as to produce a test solution suitable for assay. From the connectors the test solution moves to an accumulation station 57. After this, further treatment may take place and finally the color produced may be read in a flow colorimeter, fluorimeter, or other reading means 78.

At the accumulation station 57 steel tubes 59, 61, 63, 65 are held by a horizontal arm 67 held by a pivot 125 to a past 127 on a base 129. On post 127 is a collar 131 moving between stops 133, 135. The up and down movement of arm 67 may be controlled by a pivoted lever assembly 137 operated by a solenoid 56.

For the purpose of giving those skilled in the art a better understanding of the invention, the following illustrative examples are given.

Example 1.—Lactic dehydrogenase in human serum
(4 tests simultaneously)

The capillary is filled with 50 $\mu$l. of serum and placed on the turntable. The serum is washed with 6 ml. of saline. One-fourth of this is pumped into a single test tube. Wash volume is 4 ml. of which this tube receives one-fourth. Thus the final volume pumped into a test tube is a total of one-fourth of 10 ml. or a total of 2.5 ml. At the same time the reagent tube to the peristaltic pump for this test tube is set to pump 2 ml. of a substrate. The substrate comprises a solution of 0.1 M phosphate buffer pH 7.4 containing 20 mg. of pyruvic acid and 10 mg. of DPNH per 100 ml. The capillary tube dispenser is set to deliver 96 specimens per hour. The readout is made of the drop in absorbance at 340 m$\mu$ at the 48th position or ½ hour after mixing of the substrate with the sample. The drop in absorbance is a measure of the lactic dehydrogenase content of the solution. In this procedure the turntable is placed in an air bath with the temperature maintained at 37° C.

The other three test tubes which contain fractions of the sample are also used. Into these test tubes substrate for serum glutamic-oxalacetic transaminase (SGOT), serum glutamic-pyruvate transaminase (SGPT) and creatine phosphokinase are pumped. In each case, the pH of the 0.1 N phosphate buffer is 7.4. All the buffers contain 10 mg./100 ml. of reduced diphospho-pyridine nucleotide (DPNH) per 100 ml. Both transaminase buffers contain ketoglutaric acid but the SGOT buffer also contains malic dehydrogenase and asparatic acid. The SGPT tube also contains lactic dehydrogenase and alanine. The creatine phosphokinase tube also contains enolphosphate, adenosine diphosphate, creatine and lactic dehydrogenase.

At the readout station a 340 m$\mu$ light filter is used for each tube and in each case one measures the drop in absorbance in the ultraviolet range as DPNH goes to DPN.

Example 2.—For simultaneous determination of glucose, alkaline phosphatase and uric acid A 25 microliter sample from the capillary tube may be used. A similar set up as in Example 1 is used with similar pumping times. Two tubes each receive one-fourth of the sample for the uric acid test. In one case the buffer contains uricase and in the other, the control tube, the buffer is merely the pH 7.4 phosphate buffer. At the readout station a 243 m$\mu$ filter is used to read the uric acid in the human serum with and without the uricase. The difference in absorbance of the two tubes is a measure of the uric acid content of the serum.

In the alkaline phosphatase tube, a borate buffer pH 9.2 is used which contains phenyl phosphate. At the end of 20 minutes of incubation time 2 ml. of 5% formaldehyde is added from an automatic syringe. At the next station, 37 seconds later 2 milliliter of a solution of nuclear fast red B salt in borate buffer is added from a second automatic syringe to form a color with the phenol generated in the reaction. This is then read at the readout station at 500 m$\mu$.

For the glucose, the buffer added contains glucose oxidase, horseradish peroxidase and o-dianisidine all at a pH of 7.1 in a 0.2 M phosphate buffer. The color develops and is read at the end of 30 minutes with a 420 m$\mu$ filter at the readout station.

It is to be observed therefore that the present invention provides for an instrument that has the capability of splitting a microliter specimen accurately into a plurality of samples. The sample cup container or mixer can be loaded from a capillary dispenser. An automatic microsyringe can also be used for larger specimens. The sample splitter comprises a rigid flow tube sealed to a cup mixer and opened in such a way that the added sample can be continuously washed in with flowing diluent. This drops into the cup mixer and in practice has been demonstrated to mix efficiently without the need of a mixing device.

A plurality of tubes of narrow bore at the bottom of the cup mixer permit the simultaneous transfer of several, e.g., four aliquots of equal or unequal size by means of a peristaltic pump. The amount pumped eventually into test tubes depends upon the bore of the tubing directed to a particular test tube. Simultaneously varying amounts of reagents can be pumped into the test tube by means of tubing leading from reagent bottles and communicating with different sample carrying tubes of the peristaltic pump. Mixing is accomplished by having narrow bore tubing dipping into the bottom of each test tube during delivery of the split samples diluent and reagent. When the sample has been exhausted the peristaltic pump continues to pump air into the solution in the test tubes. In this manner an efficient mixing is accomplished in the test tubes.

The test tubes move along on a programmed course which permits heating if necessary for a fixed time, addition of other reagents if required, and finally a separate and simultaneous readout of each test tube in a set. The results obtained are then printed out on a standard printout device which prints each number in each set in a definite sequence.

It will be noted that the peristaltic pump is used to measure out relatively large volumes as compared to the microliter sample. In this manner an acceptable degree of precision can be derived with this kind of pump.

The instrument contemplated herein has a mixer container with delivery means or first peristaltic pump 15 for delivering a diluent to the mixer container 27 and specimen depositing means 21, 23 for depositing a liquid specimen in the container, where it is mixed with the diluent to form a liquid sample. There are a plurality of outlets 29, 31, 33, 35 at the base of the container, and a first set of flexible tubes 29T, 31T, 33T, 35T, has one tube connected to each of said outlets. A second set of flexible tubes 39, 41, 43, 45 are used for connection to separate reagents. Both sets of tubes are joined by connectors 49, 51, 53, 55 which unite the liquid samples flowing from the outlets and the reagents to form a test liquid. A second peristaltic pump 37 acts on both sets of flexible tubes to pump the test liquid to the connectors. A plurality of hollow needles 59, 61, 63, 65 are fed by the connectors at an accumulation station 57. The needles are disposed for vertical reciprocation so that they can be raised above and lowered into a set of test tubes, the test liquid being delivered into separate test tubes 69, 71, 73, 75. These test tubes are mounted on carriage means, e.g., a turntable 87 or a rack 87a which moves the test tubes past the accumulation station 57 up to a reading station 77 which includes reading means to read and record the sample in the test tubes. The carriage means 87, 87a and the first and second pump 15, 37 are actuated by programming means 99, so as to properly deliver the liquid specimen, liquid sample, and test liquid at appropriate work stations.

The specimens may be in a capillary tube placed on a circular dispenser or may be dispensed by a microsyringe. Also, reagent may be added at the accumulation station by automatic syringes.

Although the present invention has been described in conjunction with preferred embodiments, it is to be understood that modifications and variations may be restored to without departing from the spirit and scope of the invention, as those skilled in the art will readily understand. Such modifications and variations are considered to be within the purview and scope of the invention and appended claims.

I claim:
1. An instrument for the simultaneous analysis of a plurality of components of a single specimen, comprising in combination,
   (a) a mixer container, delivery means for delivering a diluent to said mixer container and specimen depositing means for depositing a liquid specimen in said container, said specimen and diluent forming a liquid sample, a plurality of outlets at the base of said container;
   (b) a first set of flexible tubes one tube being sealed to each of said outlets, a second set of flexible tubes for connection to separate reagents, connectors for joining the separate tubes in said first and second sets;
   (c) a peristaltic pump acting on said first and second sets of tubes to pump said liquid sample and said reagents to said connectors to form a test liquid;
   (d) a plurality of hollow needles fed by said connectors, at an accumulation station said hollow needles being disposed for vertical reciprocating movement for raising above and lowering into a set of test tubes so that the test liquid can be delivered into separate test tubes;
   (e) carriage means to move said test tubes up to and past said accumulation station along a predetermined path of travel;
   (f) a reading station including reading means to read and record the sample in said test tube along said path of travel; and
   (g) programming means to move said carriage means and actuate said pump to properly deliver said test liquid to said test tubes.

2. The instrument claimed in claim 1 wherein said carriage means is a rotating turntable.

3. The instrument claimed in claim 1 wherein said carriage means is a moving rack.

4. The instrument claimed in claim 1 including a rotating dispenser means to retain capillary tubes thereon, and, means to tilt the retained capillary tubes from the horizontal to the vertical position over said mixer container to deposit the sample therein.

5. The instrument of claim 1 including at least one dispensing station to add additional reagents after the incubation period but before the readout station.

6. An instrument for the simultaneous analysis of a plurality of components of a single specimen, comprising in combination,
   (a) a first peristaltic pump for delivering a diluent solution including a wheel with rollers, plastic tubing acted on by said wheel with rollers;
   (b) a specimen delivery station including positioning means to hold at least one capillary tube in the horizontal position and to tilt said tube over one spot at said station to deliver said specimen, a container mixer into which said specimen is delivered including spout means for receiving said sample as well as one end of said plastic tubing so as to mix said diluent and said specimen to form a sample, a plurality of outlets at the bottom of said container mixer;
   (c) a first set of flexible tubes one tube being sealed to each of said outlets, a second set of flexible tubes for connection to separate reagents, connectors for joining the separate tubes in said first and second sets, mixing said reagents and sample to form test liquids;
   (d) a second peristaltic pump acting on said first and second sets of tubes to pump said liquid sample and reagent including a wheel with rollers acting on said tubes, clamp means with a spring to hold said tubes firmly against the rollers;

(e) a plurality of hollow needles fed by said connectors at an accumulation station said hollow needles being disposed for vertical reciprocating movement for raising above and lowering into a set of test tubes so that the test liquid can be delivered therein;
(f) carriage means for holding said test tubes and move the test tubes along a predetermined path of travel;
(g) a reading station along said path of travel including separate reading means thereat to read the sample in each of said test tubes; and
(h) programming means to move said test tubes up to and past said reading means, to activate said first and second pumps and said positioning means.

References Cited

UNITED STATES PATENTS

| 2,865,303 | 12/1958 | Ferrari et al. | |
|---|---|---|---|
| 3,327,535 | 6/1967 | Sequeira | 23—259 XR |
| 3,349,815 | 10/1967 | De Baets | 23—259 XR |

MORRIS O. WOLK, Primary Examiner

R. E. SERWIN, Assistant Examiner

U.S. Cl. X.R.

23—259; 137—98, 118; 141—285